April 26, 1960
C. E. HEMMINGER ET AL
2,934,492
HYDROGENATION OF HEAVY OILS
Filed Dec. 3, 1956
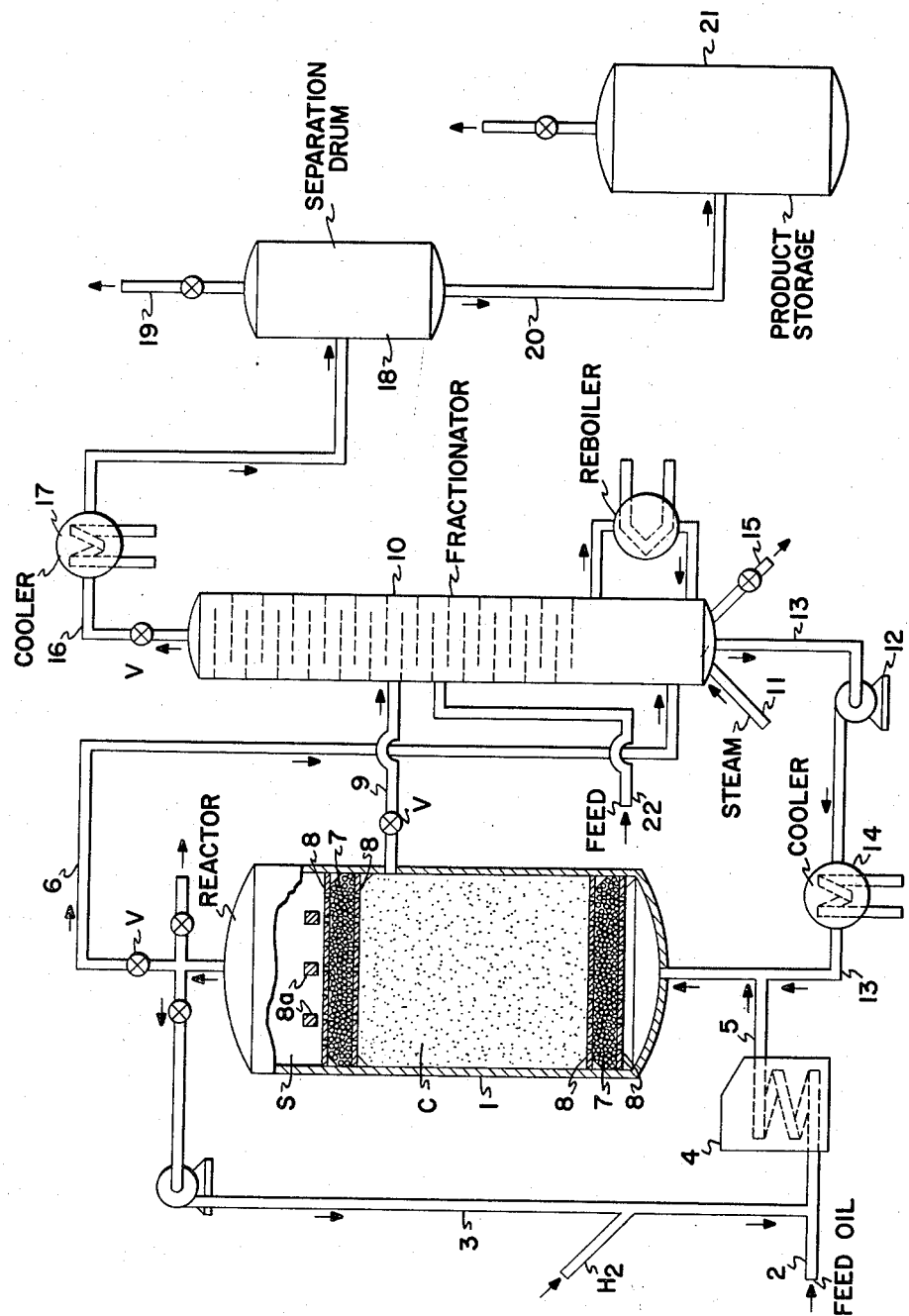
Charles E. Hemminger
Robert C. Morbeck  Inventors
By J. Cashun  Attorney 2,934,492

HYDROGENATION OF HEAVY OILS

Charles E. Hemminger and Robert C. Morbeck, Westfield, N.J., assignors to Esso Research and Engineering Company, a corporation of Delaware Application December 3, 1956, Serial No. 625,675

6 Claims. (Cl. 208—112)

The present invention relates to improvements in the destructive hydrogenation of high-boiling hydrocarbon oils. More particularly, the present invention relates to hydrogenation of high-boiling hydrocarbon oils in the liquid phase employing a fixed bed of catalyst.

The destructive hydrogenation of high-boiling oils in the presence of a catalyst has been known and used for a number of years. The purpose of such hydrogenation is to convert high-boiling oils having limited utility to more valuable lower boiling oils. In the prior art a so-called "slurry" operation was most commonly employed for the hydrogenation of heavy oils. In this process the catalyst was suspended in the oil during the hydrogenation. One series difficulty in destructively hydrogenating heavy or high-boiling oils in the presence of a catalyst suspended in the oil is that the catalyst soon acquires carbonaceous material thus masking its surface and reducing its effectiveness. Furthermore, the amount of catalyst which may be suspended in the oil is limited and ordinarily the catalyst to oil weight ratio is low so that for a given reactor volume, the throughput capacity is low. Also the product oil must be filtered to recover catalyst. Another difficulty with prior practice as outlined above is that it is difficult to control temperatures in the hydrogenation zone. The hydrogenation of hydrocarbon oils is a highly exothermic reaction and heretofore the temperature control has proved to be a very difficult problem.

In brief compass, the present invention provides means for overcoming insufficiencies of the prior art and provides a practical method for destructively hydrogenating high-boiling hydrocarbon oils, in liquid phase, to convert them to lower boiling oils such as gas oil, domestic heating oil, kereosene, diesel oil and the like. Toward this end, the present process employs a "flooded reactor," that is to say, a process in which a fixed bed of catalyst is disposed in a reactor and the said catalyst is submerged in the oil undergoing treatment. Above the oil upper level, there is a gas phase permitting separation of oil from gas in the reactor.

In the present process the heavy hydrocarbon oil feed is charged to the hydrogenation zone at a lower point thereof and passes upwardly in the presence of added hydrogen at reaction conditions in contact with the fixed bed of catalyst. As the reaction proceeds, carbonaceous material formed on the catalyst is continuously washed or scrubbed by the upflowing oil causing the removal of carbonaceous material effected by the relative motion of the oil past the stationary catalyst. Because the surface of the catalyst is maintained in a substantially clean condition the oil feed rate may be high, say 0.3 to 3.0 volumes of oil per volume of reactor per hour, values much higher than are possible where the slurry type of operation is employed.

In order to control temperatures in the reaction zone, liquid from the top of the reactor is withdrawn, cooled and a portion thereof recycled to the bottom of the reactor. One of the important features of the invention is the separation of liquid from hydrogen and product gases in the top of the reactor and the recycling of all or a portion of the liquid withdrawn through a cooler and then passed to the reactor. Thus, the cooling and liquid recycle is independent of the rate of gas flow.

Further, in accordance with the present invention, the process is preferably operated as to produce principally diesel oil and catalytic cracking feed oil, a very small amount of naphtha, and the feed oil is also partially desulfurized. With respect to the desulfurization of the oil, no effort is made to obtain more than 50 percent desulfurization although greater amounts of desulfurization may result on certain types of feed.

Feed to the present destructive hydrogenation process is either a whole or a reduced crude. As to the catalyst employable in the present process the same may be any known hydrogenation-dehydrogenation catalyst such as platinum or palladium carried on a suitable support such as alumina. Other known catalysts such as nickel, nickel sulfide and tungsten sulfide mixtures, molybdenum oxide or sulfide carried on a suitable support and the like may be employed in the present process. Cobalt molybdate carried on alumina gives excellent results.

In the accompanying drawing a suitable apparatus in which a preferred modification of the present invention may be carried out is illustrated diagrammatically.

Referring in detail to the drawing, 1 represents a reactor containing a fixed bed of hydrogenation catalyst C. The reactor is provided with ceramic balls 7 disposed in the upper and lower portions and supported on foraminous members, such as screens 8. These balls may be mullite having a diameter of about 1 to 2 inches. It is also provided with removable spaced steel beams 8a shown disposed on the screens in the upper portion of the reactor in order to maintain the balls 7 in place during use. The screens and the beams are removably positioned in the reactor to permit access to the catalyst. The screens and ceramic balls serve to break up foams and mists in the upper part of the reactor.

In operation, a feed stock enters the present system through line 2 and is mixed with hydrogen from line 3. This mixture is then heated in any suitable heating means such as a furnace 4, and then withdrawn through line 5 and charged to the bottom of reactor 1. Just prior to the time the heated oil and hydrogen in line 5 pass into reactor 1 it is mixed with cooled recycled oil in line 13. The heated mixture of oil, hydrogen and recycled oil passes upwardly in reactor 1 through the interstices between the lower ceramic balls 7 which ceramic balls are encased, as indicated, in foraminous members, such as screens, and thereafter pass upwardly through the bed of catalyst C under conditions more fully set forth hereafter in the form of specific examples.

As indicated, the reaction occurs in liquid phase and carbonaceous material which tends to deposit on the catalyst is continually washed by the flowing liquid oil so that the surface of the catalyst is maintained in a substantially clean condition. The product passes upwardly from the bed C through the upper ceramic balls 7 to an upper point in the reactor into an elongated separation zone S adapted to provide a space wherein gas and liquid are separated, the gas containing hydrogen and hydrocarbon gases passing overhead via line 6 carrying a reducing valve V. Liquid oil is withdrawn as product through line 9 carrying a reducing valve V and fed into a fractionator 10. Fractionator 10 is maintained at 50 to 100 p.s.i.g. but pressures below atmospheric can be employed. Fractionator 10 may carry 30 to 40 plates. Hydrogen in line 6, at a pressure about 10 pounds in excess of that in line 9, is charged to the bottom of fractionator 10 and passes upwardly therein stripping product oil, such product including gas oil, diesel oil and the like with a small amount of naphtha and gas.

The valve V in line 6 carrying the hydrogen-containing gas serves to reduce the pressure of the hydrogen-containing gas and in the same manner the valve V in line 9 also serves to reduce the pressure in that line to a pressure substantially less than that existing in line 6. A portion or all of the gas in line 6 may be recycled to the reactor depending on the nature of the feed stock. If the crude oil fed to the reactor is high in sulfur content, there will be formed in reactor 1 appreciable amounts of $H_2S$ and it will appear in the gas in line 6. It is undesirable to recycle this overhead gas to the reactor or charge it to the fractionator 10 since $H_2S$ will build up in the product. In order to aid in the stripping step carried out in the fractionator 10 steam in line 11 may be charged to the bottom of the fractionator.

Heavy bottoms are withdrawn from the bottom of fractionator 10 via line 13, forced through pump 12 and cooler 14 and thereafter charged to line 5 for further treatment and to control the temperature in reactor 1. A portion of the heavy bottoms may be rejected from the system via line 15. This latter withdrawal serves to remove some of the metals which are often contained in crude petroleum oil. This metal containing material may be used as a refinery fuel. Thereafter the liquid product and hydrogen, normally gaseous hydrocarbons, are withdrawn overhead through line 16 carrying a valve V, thence passed through a cooler 17, wherein it is cooled sufficiently to condense normally liquid product, thence passed to a separation drum 18. In drum 18 the gasiform material is withdrawn overhead through line 19. This material, since it contains hydrogen, may be used to hydrogenate oils, as a fuel or recycled to reactor 1. The desired product containing gas oil feed stock, diesel oil, and the like is withdrawn from separator 18 by line 20 and delivered to storage drum 21. A minor amount of naphtha is contained in the product.

When processing an atmospheric rather than a vacuum still bottoms, initial cut point of 650° F. rather than 1050° F., all or a portion is introduced into the system from line 22 to tower 10. Then the lighter portions boiling below 900° to 1100° F. are taken overhead through line 15 and the heavier portion fed to the reactor 1 through line 13.

As indicated above when the residuum feed to the process contains relatively large amounts of salts or inorganic ash material, it will tend to accumulate in the liquid recycle stream from the bottom of tower 10. To avoid undue build-up of these materials a purge stream is withdrawn through line 15. The contaminating salts can be removed, in part by distillation or extraction and part of the desalted oil returned to the present system.

In order to give more details and in particular to describe a preferred modification of the present invention, the following specific example is set forth.

EXAMPLE I

A reduced crude having the following inspection was subjected to the conditions hereinafter specified.

West Texas Vacuum residuum

| | |
|---|---|
| Reduced crude API | 8.8 |
| 650°–1000° F., vol. percent | 14 |
| 1000° F.+, vol. percent | 86 |
| Conradson carbon, weight percent | 18.3 |
| Insoluble in 86° API naphtha, weight percent | 6.5 |
| Sulfur, weight percent | 3.9 |
| Metals (calculated as such), p.p.m. | 85 |

Conditions in reactor 1

Catalyst composition:

| | |
|---|---|
| CoO ____wt. percent | 3.4 |
| $MoO_3$ ____do | 8.7 |
| $Al_2O_3$ ____do | 82.9 |
| Ignition loss ____do | 5.0 |
| Average temperature, °F. | 750 |
| Pressure, p.s.i.g. | 800 |
| Fresh feed rate, v./hr./v. | 0.5 |
| Superficial gas velocity, ft./sec. | 0.5 (0.3–0.8) |
| $H_2$ feed rate, s.c.f./bbl. oil feed | 1000 |
| Oil recycle rate, gal. recycle/gal. feed | 1.0 |

Product inspection

| | |
|---|---|
| Liquid yield, based on feed, vol. percent | 101 |
| Total product API | 18 |
| $C_4-$, vol. percent | 1 |
| $C_5-$, 430° F., vol. percent | 10 |
| 430–650° F., vol. percent | 12 |
| 650°–1000° F., vol. percent | 55 |
| 1000° F.+, vol. percent | 23 |
| Desulfurization, wt. percent | 50 |
| $H_2$ consumed, s.c.f./b. | 700 |

A second test was made on a different crude from that of Example I and the details are set forth below.

EXAMPLE II

In this run a Bachaquero crude was hydrogenated under the conditions set forth below. The crude contained 50 percent by volume of material boiling at 900° F. in addition to higher boiling material or bottoms. In this test two runs were made, one in which the oil was fed through the fixed bed of catalyst from the top to the bottom thereof and in a second run the oil was fed from the bottom of the bed upwardly and the product recovered overhead. The conditions under which the runs were carried out are set forth below.

| | Conditions | | | |
|---|---|---|---|---|
| | Downflow | | Upflow | |
| Catalyst | Same as in Example I | | | |
| Temperature, °F. | 750 | 800 | 750 | 800 |
| Pressure, p.s.i.g. | 800 | 800 | 800 | 800 |
| Oil Feed Rate, V./hr./V.[1] | 1 | 1 | 1 | 1 |
| $H_2$ Feed Rate, s.c.f./b.[2] | 3,000 | 3,000 | 3,000 | 3,000 |
| | Results | | | |
| 900° F.+Residuum Conversion, Vol. Percent | 15–20 | 45 | 35 | 65–70 |
| MNI[3] Conversion, Percent | 30–35 | 45 | 45 | 60–65 |
| $C_1$–$C_4$ Hydrocarbons Formed | Small | Small | Small | Small |

[1] V./hr./v.=Volumes of oil per hour per volume of catalyst.
[2] S.c.f./B.=Standard cubic feet of $H_2$ per barrel of oil.
[3] MNI=Modified naphtha insolubles. It signifies the percent of asphaltenes hydrogenated.

The words "residuum conversion" define a measurement of the proportion of bottoms or material boiling above 900° F. that has been hydrogenated destructively to form more valuable middle distillate fractions. Furthermore, hydrogenation activity is measured by $MNI^3$ conversion, that is to say, the degree of hydrogen saturation of asphaltenes which are aromatics containing a plurality of ring hydrocarbons in a condensed nucleus. It will be noted from the foregoing data that both the residuum conversion and the hydrogenation activity were considerably better utilizing the upflow technique than where the feed oil was forced downwardly through the fixed bed of catalyst.

The upflow operation has two distinct advantages over the downflow operation. In the upflow operation where the catalyst is submerged in oil, the oil is in the continuous phase and the oil residence time in the reaction zone is greater than in the downflow operation for the same v./hr./v. This permits a greater degree of oil conversion. The second advantage of the upflow operation is that there is a more effective oil washing of the catalyst which results in stripping off carbonaceous material from the catalyst shortly after it is deposited thereon so that the onstream phase may be continued for a longer period of time before regeneration is required and at the same time the catalyst life is extended, since it is subjected to less frequent oxidative regeneration phases.

It is pointed out that the foregoing specific examples are merely illustrative of the present invention and do not impose any limitation thereon. For example, as previously pointed out, any good known hydrogenation catalyst may be employed. For example, a catalyst which can be advantageously used is one consisting of 0.1 to 0.6 weight percent platinum or palladium deposited on alumina, preferably an alumina containing 75 to 90% eta alumina made by hydrolyzing an aluminum alcoholate as described in the Kimberlin Patent No. 2,636,865. While the operating conditions are in general the same as in the foregoing example, the advantages lie in a higher octane naphtha, 80 Research Octane rather than 50 octane and much less catalyst used. Where the cobalt molybdate can process 0.5 pound of oil per pound of catalyst per hour the above catalyst can treat 2 pounds of oil per pound of catalyst per hour.

When employing the platinum or palladium catalyst, chlorine or other halogen-containing compounds are added to the oil. This quantity is controlled so that the catalyst will contain 0.3 to 1.0 weight percent halogen, 2 to 5 times that deposited on the catalyst when it is prepared by impregnating the alumina with chloroplatinic acid before drying, pilling and calcining in known procedures. During or subsequent to regenerations chlorine can also be added to the upflowing gases to maintain the desired halogen content of the catalyst. Every effort is made to restrict the water entering the reactor to avoid chlorine loss due to the water.

The catalyst in reactor 1 may be in the form of pills, pellets, or other shaped bodies. The temperature employed in reactor 1 may vary from 650° to 950° F. while a pressure of from 100 to 2000 p.s.i.g. may be employed in said reaction zone. Furthermore, the contact time of the oil in the reaction zone may vary from that corresponding to 0.1 to 3.0 volumes of oil per hour per volume of catalyst in the reactor. With respect to the hydrogen consumption this may vary from 100 to 3000 standard cubic feet of hydrogen fed to the reaction zone per barrel of oil fed. The recycle gas rate is from 2 to 10 times the hydrogen consumption rate. The present process may be conveniently carried out in a refinery in which there is available hydrogen resulting from a hydroforming operation also carried out in said refinery which operation usually results in a net production of hydrogen over and above that required in the hydroforming operation itself.

To recapitulate briefly, the present invention relates to a method of upgrading a hydrocarbon oil such as a reduced crude or a whole crude in order to produce by destructive hydrogenation products such as fractions boiling within the range of from about 400° F. to 800° F., which may be employed as a feed stock to a catalytic cracking operation. It may also be employed as a diesel oil. The process is characterized in that it is carried out in liquid phase employing a "flooded reactor" which means that the catalyst in the reactor is submerged in liquid oil which serves to wash the catalyst to remove carbonaceous deposits therefrom.

Numerous modifications of the invention may be made by those familiar with the present art.

What is claimed is:

1. An improved method for destructively hydrogenating a high boiling hydrocarbon oil feed selected from the group consisting of a whole crude and a reduced crude which comprises charging the oil to a lower point of a reaction zone together with hydrogen, causing the said oil to flow upwardly in said reaction zone in contact with a fixed bed of catalyst submerged in said oil, maintaining hydrogenation conditions of temperatures of from 650–950° F., pressures of from 100–2000 p.s.i.g. and contact time in said reaction zone sufficient to convert the hydrocarbon feed into products the major proportion of which boil in the range of from about 400–800° F., separating oil product from gasiform material in a contiguous zone above and in the same confined space as said reaction zone, removing liquid oil product from said reaction zone and charging said liquid oil product to a distillation and stripping zone, separately removing hydrogen-containing gas from said contiguous zone, feeding a gasiform material comprising hydrogen-containing gas removed from said contiguous zone into the bottom of said distillation and stripping zone and causing it to flow upwardly therein, removing overhead from said last-named zone gasiform and hydrocracked material, withdrawing high boiling oil from the bottom of said distillation and stripping zone, cooling said high boiling oil, returning said oil to the reaction zone, and treating the material withdrawn overhead from the fractionation and stripping zone for product recovery.

2. The method of claim 1 in which the catalyst comprises cobalt molybdate.

3. The method of claim 1 in which the catalyst comprises platinum carried on alumina.

4. The method of claim 1 in which the distillation and stripping zone is maintained under a lower pressure than that existing in the reaction zone.

5. The method of claim 1 in which the high boiling material in the fractionation and stripping zone is heated and thereafter cooled before recycling to the reaction zone.

6. The method of destructively hydrogenating a reduced crude petroleum oil which comprises providing a reaction zone containing a fixed bed of a hydrogenation catalyst and a fractionation and stripping zone in communication therewith, feeding said reduced crude into the last-named zone, maintaining said last-named zone under a low pressure, causing a stripping gas to flow upwardly in said fractionation and stripping zone, adding heat to said last-named zone to remove overhead lower boiling oil by the combined effect of the gas stripping and added heat, withdrawing high boiling oil as bottoms, cooling said bottoms, feeding said bottoms to a lower point in said reaction zone, adding hydrogen to said reaction zone, causing the oil and hydrogen to flow upwardly in said reaction zone in contact with said catalyst submerged in liquid oil, providing a gas-oil separation in said reaction zone in a space above the upper oil level, maintaining hydrogenation conditions of temperatures of from 650–950° F., pressures of from 100–2000 p.s.i.g. and oil residence time in said reaction zone sufficient to convert the hydrocarbon feed into products the major proportion of which boil in the range of from about 400–800° F., withdrawing oil from the reaction zone at an upper point thereof and feeding said withdrawn oil to said fractionation and stripping zone, separately withdrawing hydrogen-containing gas from said reaction zone and feeding said gas to the bottom of said fractionation and stripping zone and causing said gas to flow upwardly in the last-named zone to effect removal overhead of lower boiling oils and treating the withdrawn oils for product recovery.

References Cited in the file of this patent

UNITED STATES PATENTS

| | | |
|---|---|---|
| 2,554,282 | Voorhies | May 22, 1951 |
| 2,644,785 | Harding et al. | July 7, 1953 |
| 2,662,846 | Montgomery et al. | Dec. 15, 1953 |
| 2,706,167 | Harper et al. | Apr. 12, 1955 |
| 2,768,936 | Anderson et al. | Oct. 30, 1956 |
| 2,781,324 | Haensel | Feb. 12, 1957 |